United States Patent
Cadet et al.

(10) Patent No.: US 11,972,526 B1
(45) Date of Patent: Apr. 30, 2024

(54) RENDERING OF ENROLLED USER'S FACE FOR EXTERNAL DISPLAY

(71) Applicant: Apple Inc., Cupertino, CA (US)

(72) Inventors: Gilles M. Cadet, Agoura Hills, CA (US); Shaobo Guan, Redwood City, CA (US); Olivier Soares, Oakland, CA (US); Graham L. Fyffe, Playa Vista, CA (US); Yang Song, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/375,204

(22) Filed: Sep. 29, 2023

Related U.S. Application Data

(60) Provisional application No. 63/456,136, filed on Mar. 31, 2023.

(51) Int. Cl.
| | |
|---|---|
| *G06T 17/00* | (2006.01) |
| *G02B 27/01* | (2006.01) |
| *G06F 3/14* | (2006.01) |
| *G06T 13/40* | (2011.01) |
| *G06T 17/20* | (2006.01) |
| *G06V 40/16* | (2022.01) |

(52) U.S. Cl.
CPC ............ *G06T 17/20* (2013.01); *G02B 27/017* (2013.01); *G06F 3/1431* (2013.01); *G06T 13/40* (2013.01); *G06V 40/165* (2022.01)

(58) Field of Classification Search
None
See application file for complete search history.

(56) References Cited

U.S. PATENT DOCUMENTS

| | | |
|---|---|---|
| 9,959,678 B2 | 5/2018 | Katz et al. |
| 10,394,315 B2 | 8/2019 | Yang et al. |

(Continued)

FOREIGN PATENT DOCUMENTS

| | | |
|---|---|---|
| WO | 2022055742 A1 | 3/2022 |
| WO | 2022140658 A2 | 6/2022 |

OTHER PUBLICATIONS

U.S. Appl. No. 18/375,058 entitled "Rendering of a Guest User's Face for External Display," Giles M. Cadet et al., 41 pages, filed with the U.S. Patent and Trademark Office on Sep. 29, 2023.

(Continued)

*Primary Examiner* — Martin Mushambo
(74) *Attorney, Agent, or Firm* — Thompson Hine LLP

(57) ABSTRACT

Various implementations disclosed herein include devices, systems, and methods that present a view of a device user's face portion, that would otherwise be blocked by an electronic device positioned in front of the face, on an outward-facing display of the user's device. The view of the user's face portion may be configured to enable observers to see the user's eyes and facial expressions as if they were seeing through a clear device at the user's actual eyes and facial expressions. Various techniques are used to provide views of the user's face that are realistic, that show the user's current facial appearance, and/or that present the face portion with 3D spatial accuracy, e.g., each eye appearing to be in its actual 3D position. Some implementations combine live data with previously-obtained data, e.g., combining live data with enrollment data.

25 Claims, 3 Drawing Sheets

(56) References Cited

U.S. PATENT DOCUMENTS

| | | |
|---|---|---|
| 10,495,882 B1 | 12/2019 | Badino et al. |
| 10,726,584 B2 | 7/2020 | Trim et al. |
| 10,832,481 B2 | 11/2020 | Graham et al. |
| 11,079,842 B2 | 8/2021 | Cancel Olmo et al. |
| 11,210,832 B2 | 12/2021 | Ballagas et al. |
| 11,462,000 B2 | 10/2022 | Meier et al. |
| 11,579,693 B2 | 2/2023 | Hulbert et al. |
| 11,736,679 B2 | 8/2023 | Matsuda et al. |
| 11,740,742 B2 | 8/2023 | Wang et al. |
| 11,743,064 B2 | 8/2023 | Cheung |
| 11,822,736 B1 | 11/2023 | Shin et al. |
| 11,830,628 B1 | 11/2023 | Thorn |
| 11,861,255 B1 | 1/2024 | Ive et al. |
| 2009/0202114 A1* | 8/2009 | Morin ............... A63F 13/12 382/118 |
| 2012/0079378 A1* | 3/2012 | Goossens ............. G06T 17/10 715/849 |
| 2012/0139830 A1* | 6/2012 | Hwang ............... G06V 40/16 345/156 |
| 2014/0085293 A1* | 3/2014 | Konoplev ............ A63F 13/55 345/419 |
| 2014/0198121 A1* | 7/2014 | Tong ................. G06T 11/60 345/581 |
| 2015/0253573 A1 | 9/2015 | Sako et al. |
| 2017/0287217 A1 | 10/2017 | Kim et al. |
| 2018/0004478 A1 | 1/2018 | Chen |
| 2018/0060683 A1 | 3/2018 | Kontsevich et al. |
| 2018/0158246 A1 | 6/2018 | Grau et al. |
| 2019/0082170 A1 | 3/2019 | Akahori |
| 2019/0286406 A1 | 9/2019 | Chen |
| 2020/0088999 A1 | 3/2020 | Wang |
| 2020/0225734 A1 | 7/2020 | Magnusson et al. |
| 2021/0281802 A1 | 9/2021 | Kirisken |
| 2023/0418370 A1 | 12/2023 | Wu |

OTHER PUBLICATIONS

U.S. Patent and Trademark Office, Non-Final Office Action, U.S. Appl. No. 18/375,058, 18 pages, Nov. 24, 2023.

Mai, C. et al., "Frontal Screens on Head-Mounted Displays to Increase Awareness of the HMD Users' State in Mixed Presence Collaboration," 10 pp. May 15, 2019, URL: https://arxiv.org/pdf/1905.06102.pdf.

Rekimoto, J. et al., "Behind-the-Mask: A Face-Through Head-Mounted Display," 5 pages, 2018.

Peng, Z. et al., "Human Face Reconstruction under a HMD Occlusion," 2 pages, 2019.

\* cited by examiner

RENDERING OF ENROLLED USER'S FACE FOR EXTERNAL DISPLAY

CROSS-REFERENCE TO RELATED APPLICATION

This application claims the benefit of U.S. Provisional Application Ser. No. 63/456,136 filed Mar. 31, 2023, which is incorporated herein in its entirety.

TECHNICAL FIELD

The present disclosure generally relates to electronic devices, and in particular, to systems, methods, and devices for representing users of electronic devices.

BACKGROUND

While a user uses an electronic device, the device may be in a position that blocks others around the user from seeing a portion of the user. For example, when a user holds a device up in front of their face or wears a device (e.g., such as a head-mounted device (HMD)), others in the same room/environment may not be able to see the eyes or other portions of the user's face.

SUMMARY

Various implementations disclosed herein include devices, systems, and methods that present a view of a device user's face portion (that would otherwise be blocked by an HMD, wearable device, or other electronic device positioned in front of a user's face) on an outward facing display of the user's device. Displaying the user's face portion may be configured to enable observers to see the user's current eyes and facial expressions as if they were seeing through a clear device at the user's actual eyes and facial expressions. Various techniques are used to provide views of the user's face that are realistic, that show the user's current facial appearance, and/or that present the face portion with 3D spatial accuracy, e.g., each eye appearing to be in its actual 3D position for different observation viewpoints around the user.

Some implementations combine live data (e.g., based on live eye camera data) with enrollment data (e.g., enrolled panels based on views of the face without the face being blocked by the device and in one or more lighting conditions). The view may be provided based on mapping such combined data (e.g., an inferred image/panel representing the current appearance of the user's face portion) to a 3D mesh and then providing the view of the mesh (on the external display) for an observation viewpoint so that the eyes (and other parts of the face) appear to an observer looking at that device from that observation viewpoint as if the eyes (and other parts of the face) were in their actual 3D positions.

In general, one innovative aspect of the subject matter described in this specification can be embodied in methods of operations performed at an electronic device having a processor. Such a method may involve obtaining first data corresponding to a current appearance of a face portion, e.g., live eye camera or other sensor data depicting each eye and other face areas captured while the user wears an HMD. The first data may be based on first sensor data captured live via one or more sensors, such as one or more inward and/or outward facing sensors on an HMD that capture IR or color images, depth data, motion data, etc. corresponding a user's face or other body portions.

The method further obtains second data corresponding to a user appearance attribute, where the user appearance attribute is based on second sensor data corresponding to a prior appearance of the face portion. In one example, the user appearance attribute depicts a user's skin color, e.g., providing or being based on color images of the user's face from a previously-performed enrollment process. The user appearance attribute may provide information about the appearance of the user which is not captured as well in the first data. For example, the first data may be limited to IR data which provides little color information and the second data can provide color information about the colors of the user's face, eyes, skin, eye brows, eye lashes, etc. The second data may correspond to a set of previously-obtained enrollment data such as an enrollment 3D mesh and/or orthographic projections depicting the eyes and surrounding face areas. Such orthographic projections or other aspects of the second data may correspond to images/panels based on (a) images captured while the device is not being worn so that otherwise blocked portions of the face are depicted and in color and/or (b) images corresponding to different lighting conditions/directions, e.g., enrolled panels with neutral eyes open and looking straight forward for each of a set of different lighting conditions.

The method generates a representation of the face portion based on the first data and the second data. For example, in some implementations, this may involve a rendering neural network (or other machine-learning model) that inputs first data that includes live eye camera data and second data that includes prior facial appearance attribute data to output content, e.g., an image/inferred panel representing the current appearance of the face portion with the appearance attribute. This may involve comparing the live eye camera data (e.g., showing the eye in its current gaze direction) with the neutral eye camera data (e.g., showing the eye with a straight-forward gaze direction) to extract eye motion and using that motion to produce the content, e.g., the image/inferred panel.

The method presents the representation of the face portion on an outward facing display of the wearable electronic device. The representation of the face portion (e.g., the inferred panel) gets mapped to a 3D face model (e.g., a mesh generated based on enrollment data and corresponding to a 3D shape of the face) and displayed on the front of the device. The view displayed on the outward facing display may display the eyes to appear to be at their accurate 3D positions by displaying content based on an observation viewpoint/direction. Views for multiple observation viewpoints/directions may be simultaneously displayed e.g., using a lenticular display to present multiple views that are each only visible from particular and corresponding observation viewpoints/directions.

The outward facing display may be a flat planar display, a flat curved display, or have any other shape and the view that is presented may account for that display shape.

A view may depict the current appearance of eyes and surrounding areas that would otherwise be blocked by the device. If the device is moved (e.g., up and down on the user's face), the eyes appear to stay in the same positions corresponding to their actual positions as the view adjusts accordingly.

The representation may also be adjusted to limit contrast between the sclera and skin to avoid artifacts, e.g., ensuring that white eye portions do not appear significantly whiter than light skin areas to avoid an appearance of brighter-than-real eyes or other objectionable appearance.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
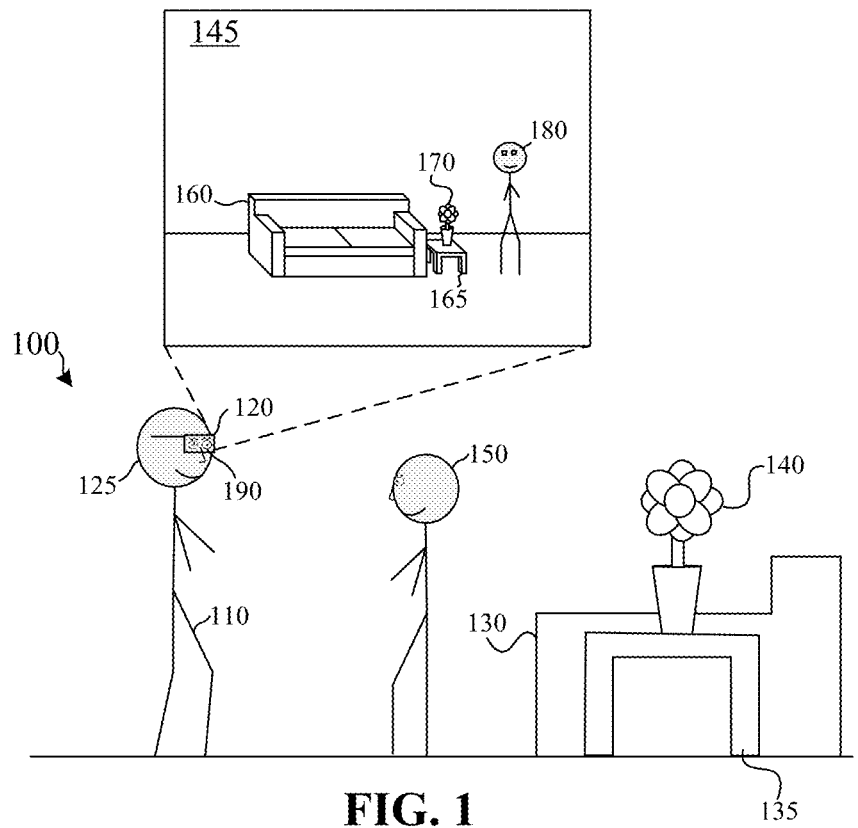
FIG. 1 illustrates an environment with a device presenting a view of a face portion of a user according to some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 illustrates an example physical environment 100 (e.g., a room) including a device 120. In some implementations, the device 120 displays content to a user 110, e.g., extended reality (XR) content. For example, content may include representations of the physical environment 100 (e.g., passthrough video) and/or virtual content, e.g., user interface elements such as menus, buttons, icons, text boxes, graphics, avatars of another device user, etc. In the example of FIG. 1, the environment 100 includes another person 150, a couch 130, a table 135, and flowers 140, and the device 120 displays a view 145 to user 110 on one or more internal displays. The view 145 includes a depiction 160 of the couch 130, a depiction 165 of the table 135, a depiction 170 of the flowers 140, and a depiction 180 of the other person 150.

In some implementations, the device 120 includes virtual content (not shown) in the view 145. Such virtual content may include a graphical user interface (GUI). In some implementations, the user 120 interacts with such virtual content through virtual finger contacts, hand gestures, voice commands, use of an input device, and/or other input mechanisms. In some implementations, the virtual content enables one or more application functions including, but not limited to, image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program products configured for execution by one or more processors.

While this example and other examples discussed herein illustrate a single device 120 in a real-world environment 100, the techniques disclosed herein are applicable to multiple devices performing some or all of the functions. In some implementations, the device 120 is a wearable device such as an XR headset, smart-glasses, or other HMD, as illustrated in FIG. 1. In some implementations, the device 120 is a handheld electronic device (e.g., a smartphone or a tablet) held or otherwise positioned in front of the user's face. In some implementations the device 120 is a laptop computer or a desktop computer held or otherwise positioned in front of the user's face.

The device 120 obtains image data, depth data, motion data, and/or other sensor data associated with the user 110 and/or the physical environment 100 via one or more sensors. For example, the device 120 may obtain infrared (IR) images of a portion of the user's head 125 from one or more inward-facing infrared cameras while the device 120 is being worn by the user 110. In some implementations, the sensors may include any number of sensors that acquire data relevant to the appearance of the user 110. For example, when wearing an HMD, one or more sensors (e.g., cameras inside the HMD) may acquire images associated with the eyes and surrounding areas of the user and one or more sensors on the outside of the device 120 may acquire images associated with the user's body (e.g., hands, lower face, forehead, shoulders, torso, feet, etc.) and/or the physical environment 100.

In some implementations, the device 120 includes an eye imaging and/or eye tracking system for detecting eye position and eye movements via eye gaze characteristic data. For example, an eye tracking system may include one or more infrared (IR) light-emitting diodes (LEDs), an eye tracking camera (e.g., near-IR (NIR) camera), and an illumination source (e.g., an NIR light source) that emits light (e.g., NIR light) towards the eyes of the user 25. Moreover, the illumination source of the device 120 may emit NIR light to illuminate the eyes of the user 110 and the NIR camera may capture images of the eyes of the user 110. In some implementations, images captured by the eye tracking system may be analyzed to detect position and movements of the eyes of the user 110, or to detect other information about the eyes such as appearance, shape, state (e.g., wide open, squinting, etc.), pupil dilation, or pupil diameter. Moreover, the point of gaze estimated from the eye tracking images may enable gaze-based interaction with content shown on one or more near-eye displays of the device 120.

In some implementations, the device 120 includes a hand tracking system for detecting hand position, hand gestures/configurations, and hand movements via hand tracking data. For example, the device 120 may include one or more outward facing cameras, depth sensors, or other sensors that capture sensor data from which a user skeleton can be generated and used to track the user's hands. Hand tracking information, e.g., gestures, and/or gaze tracking data may be used to provide input to the device 120.

The device 120 uses sensor data (e.g., live and/or previously-captured) to present a view 190 depicting a face portion of the user 110 that would otherwise be blocked by the device 120. The view 190 is presented on an outward facing display of the user's device 120 and may be visible to the other person 150. The other person 150 may observe the view depicting the face portion of user 110 to see a relatively accurate representation of the current and moving face portion of the user 110. The view may be aligned to provide 3D accuracy, e.g., such that the other person 150 sees the face portion of the user 110 with face portion appearing in its actual 3D position, e.g., as if a front area of the device 120 were transparent and the other person were viewing the face of the user 110 directly through the transparent area.

Figure 2:
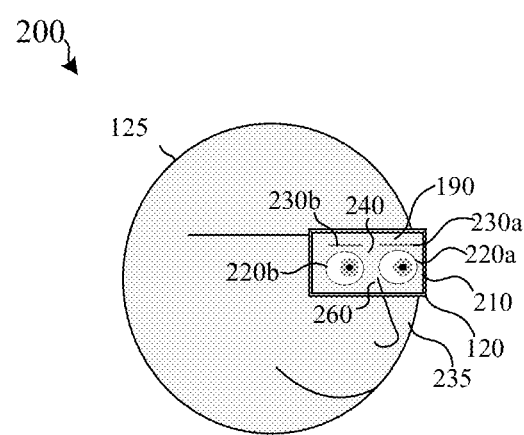
FIG. 2 illustrates an enlarged visualization of the head of the user and the device of FIG. 1, in accordance with some implementations.

FIG. 2 provides an enlarged illustration of the head of the user 110 and the device 120 of FIG. 1. As illustrated, the device 120 includes an outward-facing display 210 (e.g., on the front surface of device 120 and facing outward away from the eyes of the user 110 to display content to one or more other persons in the physical environment 100). In some implementations, the display 210 is only activated to display content (e.g., the user's face portion) when one or more other persons are detected within the physical environment 100, detected within a particular distance or area, detected to be looking at the device 120, or based on other suitable criteria.

The display 210 presents view 190, which in this example includes a depiction 220a of a left eye of the user 110, a depiction 220b of a right eye of the user 110, a depiction 230a of the left eyebrow of the user 110, a depiction 230b of the right eyebrow of the user 110, depiction 240 of skin around/near the eyes of the user 110, and depiction 260 of an upper nose portion of the user 110, etc. The view 190 provides depictions of a face portion that would otherwise be blocked from view by the device 120. The display of the user's face portion may be configured to enable observers (e.g., the other person 150) to see the user's current eyes and facial expressions as if the person 150 were seeing through a clear device at the actual eyes and facial expressions of user 110.

The view 190 may be updated over time, for example, providing a live view of the appearance of the face portion of the user such that the person 150 sees the eyes and facial appearance/expressions of the user 110 changing over time. Accordingly, such a live updated view 190 may be based on live updated sensor data, e.g., capturing inner camera data signal over time and repeatedly updating the representation of the face portion for each point in time, e.g., every frame, every 5 frames, every 10 frames of the display cycle.

The view 190 of the user's face portion may be configured to be realistic and correspond to the user's current appearance. This may be achieved or facilitated, for example, by utilizing both live and previously-captured information about the appearance of the user's face portion. In one example, enrollment data (e.g., from an enrollment period prior to the live experience) and live data are combined to provide a view of the user's face portion. The live data may provide information about the current state of the face portion while the enrollment data may provide information about one or more attributes of the face portion that are un-attainable or not captured as well in the live environment (e.g., corresponding to portions of the face portion that are blocked from live sensor capture by the device being worn or corresponding to color, 3D shape, or other elements of the face portion that are not captured or depicted as accurately by the live sensors). In one example, prior enrollment data is captured while the user 110 is not wearing the device 120 while the live data is captured while the user 110 is wearing the device 120. Some implementations combine live data, e.g., based on live eye camera data, with enrollment data, e.g., enrolled panels based on views of the face without the face being blocked by the device and in one or more lighting conditions.

The view 190 of the user's face portion may be configured to present the face portion with 3D spatial accuracy, e.g., each eye appearing to be in its actual 3D position for different observation viewpoints around the user. This may involve determining a 3D appearance of the face portion (e.g., mapping an image of the face portion onto a 3D model of the face portion) and providing a view of the 3D appearance of the face portion for a particular observer viewpoint/direction, e.g., based on the relative positioning of the other person 150. The view may be provided based on mapping combined data (e.g., an inferred image/panel representing the current appearance of the user's face portion based on live and previously-captured enrollment data) to a 3D mesh and then providing the view of the 3D mesh (on the external display) based on an observer viewpoint so that the eyes appear to an observer at that viewpoint in their actual 3D position. The shape of the display 210 and/or its position relative to the user 110 (e.g., where it is on the user's face) may be used in providing the view so that the eyes and surrounding areas appear to be spatially accurate.

Figure 3:
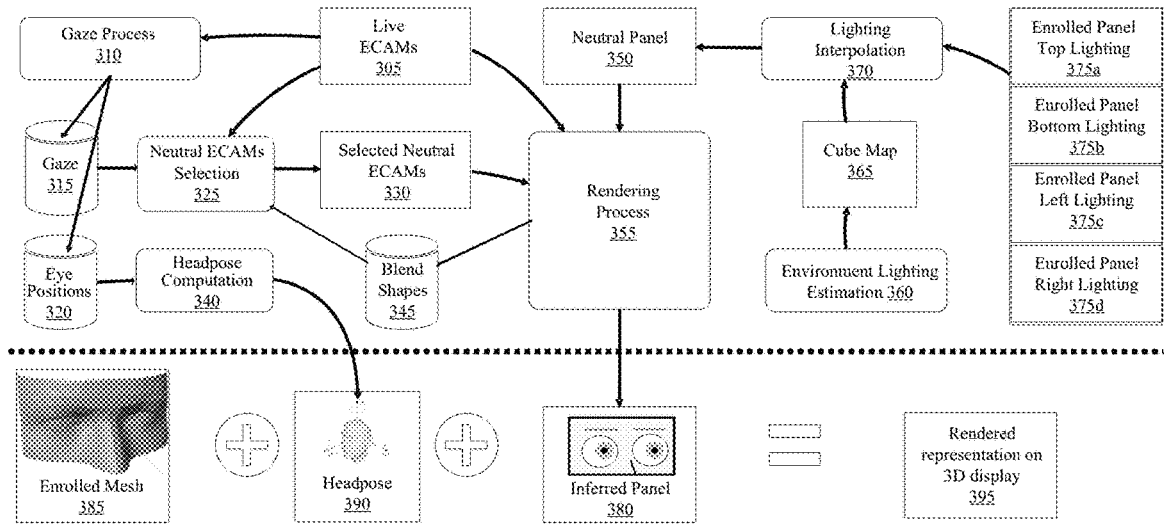
FIG. 3 is a process flow chart illustrating an exemplary rendering technique in accordance with some implementations.

FIG. 3 is a process flow chart illustrating an exemplary rendering technique. In this example, a rendering process 355 receives various inputs from both live and previously-captured sources and outputs a representation of a face portion of the user, i.e., inferred panel 380. The rendering process 355 may be implemented as an algorithm or a machine learning model such as a neural network that is trained to produce an inferred panel or other such representation based on the combined inputs. Such a network may use training data that provides accurate depictions of current face portions corresponding to training input data, e.g., actual or synthetically-generated renderings of the training face portions mimicking sensor captured-data.

In the example of FIG. 3, the rendering process 355 receives input that includes a neutral panel 350 generated based (at least in part) on previously-captured user data, e.g., sensor data from a previously-completed enrollment process in which images and/or other sensor data of the user were captured. Such images may correspond to different lighting conditions, different viewpoints, and/or different facial expressions, e.g., one or more images captured with light illuminating the user from the right side, one or more images captured with light illuminating the user from the left side, one or more images captured with light illuminating the user from the top, one or more images captured with light illuminating the user from below the user's face, one or more images captured with the user's face turned to the left, one or more images captured with the user's face turned to the right, one or more images captured with the user's face tilted up, one or more images captured with the user's face tilted down, one or more images captured with the user's face smiling, one or more images captured with the user's face exhibiting a neutral expression, one or more images captured with the user's face exhibiting an specific facial expression, one or more images captured with the user's mouth open, one or more images captured with the user's mouth closed, one or more images captured with the user's eyes open, one or more images captured with the user's eyes closed, one or more images captured with the user's eye brows raised, one or more images captured with the user's eye brows down, etc.

In some implementations, during an enrollment process (on the same or different device), the user is guided to capture enrollment sensor data. For example, the user may be guided to capture images of themselves by holding the device out in front of them such that sensors that would normally be outward facing when the device is being worn would be oriented towards the user's face. Such outward facing sensors may capture data of a type or quality that inward facing sensors on the device do not. For example, inward-facing sensors on the device may be IR cameras while the outward facing sensors may capture color image data not captured by the IR cameras. Sensor data captured during enrollment may also be captured while the user is not wearing the device and thus include or represent parts of the user's face that are blocked (from capture by any sensor) while the device is being worn, e.g., parts of the user's face that are covered or in contact with a light seal of an HMD device while the HMD is being worn.

In some implementations, enrollment data comprises data that is generated based on captured sensor data. For example, images of the user may be captured during an enrollment process which occurred in a particular lighting condition (e.g., light from the top). This data may be used to generate enrolled panels corresponding to different lighting conditions, e.g., enrolled panel top lighting 375a depicting a portion of the user's face illuminated by top lighting, enrolled panel bottom lighting 375b depicting the portion of the user's face illuminated by bottom lighting, enrolled panel left lighting 375c depicting the portion of the user's face illuminated by left lighting, and enrolled panel right lighting 375d depicting a portion of the user's face illuminated by right lighting. In this example, these enrolled panels 375a-d are orthographic projections of a portion of the user's face generated based on the sensor data obtained at enrollment to which synthetic lighting has been included.

In FIG. 3, at runtime/rendering time, an environment lighting estimation 360 is performed by the device, e.g., determining the locations of one or more light sources in the environment and/or the directions relative to the device/user of light in the environment. In this example, the lighting estimation is used to provide a cube map 365 representing the lighting which is used at lighting interpolation block 370 to generate a neutral panel (e.g., corresponding to the current lighting condition represented by the cube map 365 with the user's face in a neutral configuration, i.e., eyes open, looking straight forward, neutral expression, etc.). This may involve interpolating values from the enrolled panels 375a-d. For example, if the face is being lit from the bottom left side, then the neutral panel may be generated by interpolating between the enrolled panel lift lighting 375c and the enrolled panel bottom lighting 375b. The amount of blending or other interpolation may be based on the specific location and characteristics of a light source and/or amount of light illuminating the face from a particular direction.

The rendering process 355 uses the neutral panel as one of its inputs in producing the inferred panel 380.

In FIG. 3, the rendering process 355 also uses eye camera data which may be based at least in part on live sensor data, e.g., sensor data being currently captured during the user's wearing of the device and the presentation of a view of the face portion on an external display of the device. In this example, live ECAMS (i.e., eye cameras) capture sensor data (e.g., IR images) of parts of the user's face that are inside and not covered by the device while the device is being worn by the user. Such parts of the user face may, but do not necessarily, include the user's eyes, eye lids, eyebrows, and/or surrounding facial areas but do not include areas of the face that are covered by portions of the device contacting the user's face (e.g., the device's light seal). Live ECAM data may be captured by the live ECAMS 305 for multiple purposes, e.g., for use in tracking the user's gaze for input and/or other purposes as well as for generating a view of the user's face portion for display on an external display of the device. Using the same eye region sensors for multiple purposes may improve device efficiency and enhanced performance properties.

In the example of FIG. 3, the live ECAMs 305 provide sensor data (e.g., IR images of each of the eyes and surrounding areas) to the rendering process 355 as well as to a gaze process 310 and a neutral ECAMs selection 325 block. The gaze process 310 uses the data from the live ECAMS 305 to determine eye characteristics such as gaze 315 (e.g., gaze direction) and/or eye positions 320 (e.g., 6 DOF eye ball poses). The gaze 315 is used by neutral ECAMs selection 325 block, along with the data from the live ECAMS 305, to produce selected neutral ECAMs 330, which provide data e.g., image data corresponding to neutral eye state in which the eye is open and looking straight forward.

The rendering process 355 may produce inferred panel 380 and/or blendshapes. Blendshapes may represent facial features and/or expressions. In one example, blendshapes represent a detected facial expression. In one example, blendshapes use a dictionary of named coefficients representing the detected facial expression in terms of the movement of specific facial features. The neutral ECAMs selection 325 block may use gaze 315 and/or the blendshapes 345 to compute information such as a neutral score. In some implementations, at each frame, the neutral ECAMs are replaced by the live ECAMS 305 each time the neutral score is improved.

The live ECAMs 305 data and the selected neutral ECAMs 330 data is used by the rendering process 355 in producing the inferred panel 380. In this example, the rendering process receives input including the neutral panel 350, live ECAMs 305 data, and selected neutral ECAMs 330 data, and produces an inferred panel 380 as output. In some implementations, the live ECAMs 305 data and selected neutral ECAMs 330 data is compared to estimate a difference, e.g., how much and/or how features in the live ECAMs 305 data differ from the same features in the selected neutral ECAMs 330 data. This may involve identifying such features in corresponding eye images from each set of data and determining amounts of movement/difference between their locations. In some implementations, the rendering process 355 is a neural network or other machine learning model that accounts for such differences (e.g., implicitly without necessarily being explicitly trained to do so) in modifying the input neutral panel 350 data to produce inferred panel 380.

Conceptually, the rendering process can use the live ECAMs 305 data to determine how much and how the current eye area appearance differs from its neutral appearance and then apply the determined difference to modify the neutral panel 350 to produce an inferred panel 380 correspond to the current eye area appearance. In this way, in this example, previously-captured face portion attributes (e.g., from enrollment) that are present/represented in the neutral panel 350 are combined with live data from the live ECAMs 305 to produce an inferred panel 380 that corresponds to the current appearance of the user's face portion while also including accurate attributes from the previously obtained (e.g., enrollment) data.

In the lower portion of FIG. 3, the inferred panel 380 produced by the rendering process 355 is combined with other data to produce a rendered representation on a display 395. In this example, the inferred panel 380 is applied to add color/texture to an enrolled mesh 385 (e.g., a 3D model of the face portion generated previously such as during the user's enrollment while the user was not wearing the device).

Headpose 390 information may also be determined, for example, by headpose computation 340 block using eye position data and/or other data such as IMU data, SLAM data, VIO data, etc. to determine a current headpose 390. Such a headpose may identify position and/or orientation attributes of the device/user's head, e.g., identifying a 6 DOF pose of the user's head. Headpose 390 may be used to determine where to spatially position the textured 3D mesh (combination of enrolled mesh 385 with inferred panel 380) in relation to the user's head/device 3D position for rendering purposes, e.g., where the face portion is positioned in a 3D space relative to a viewpoint position/direction for rendering purposes.

A 3D position or viewpoint direction of an observer may be estimated and used in producing the rendered representation of the face portion on the 3D display 395. An observer may see an image of the face portion displayed on an external 2D display of the device, e.g., on a flat or curved-flat front surface such that each of the displayed eyes and other areas of the face portion appear to be at locations at which they would appear if the device were see through and the observer was observing the user's actual face.

In some implementations, the display provides different views for different observer viewpoints, e.g., using a lenticular display that displays images (e.g., 10+, 15+, 25+, etc. images) for different observer viewpoints such that, from a given viewpoint an observer, views an appropriate view, e.g., with the displayed face portion's 3D position appearing to match the corresponding actual face portion's actual current position. In such a configuration, an observer's actual viewpoint need not be determined since the observer will view an appropriate image for their current viewpoint based on the characteristics of the display device.

The rendering process of FIG. 3 can be repeated over time, for example, such that an observer sees what appears to be a live 3D video of the user's face portion including eye movements and facial expression changing over time on an external display of the device.

In one example, the live ECAMs 305 data is received as a series of frames and the rendering process 355 produces an inferred panel 380 that is used to display an updated rendered representation of the face portion on the 3D display 395 for each eye data frame. In other implementations, the rendered representation 395 is updated less frequently, e.g., every other eye data frame, every $10^{th}$ eye data frame, etc.

Some of the data in the process need not be updated during the live rendering. For example, the same set of enrolled panels 375*a-d* may be used for multiple frames, e.g., for all frames, during the live rendering of the face portion. In this example, the lighting interpolation 370 may use that static data (i.e., enrolled panels 375*a-d*) based on current environment lighting estimation 360 that may or may not be updated during the live rendering. In one example, the environment lighting estimation 360 and lighting interpolation 370 occur just once at the beginning of a user experience. In another example, the lighting estimation 360 and lighting interpolation 370 occurs during every frame of data capture during a user experience. In other examples, these processes occur periodically and/or based on detecting conditions (e.g., lighting) changing above a threshold during a user experience.

The enrolled mesh 385 similarly need not be updated during the live rendering. The same enrolled mesh 385 may be used for all rendered representations 395 during a user experience. In another implementation, an enrolled mesh 385 is updated during the user experience, e.g., via an algorithm or machine learning process, that uses live data to modify an enrolled mesh 385 before applying the current inferred panel 380.

Figure 4:
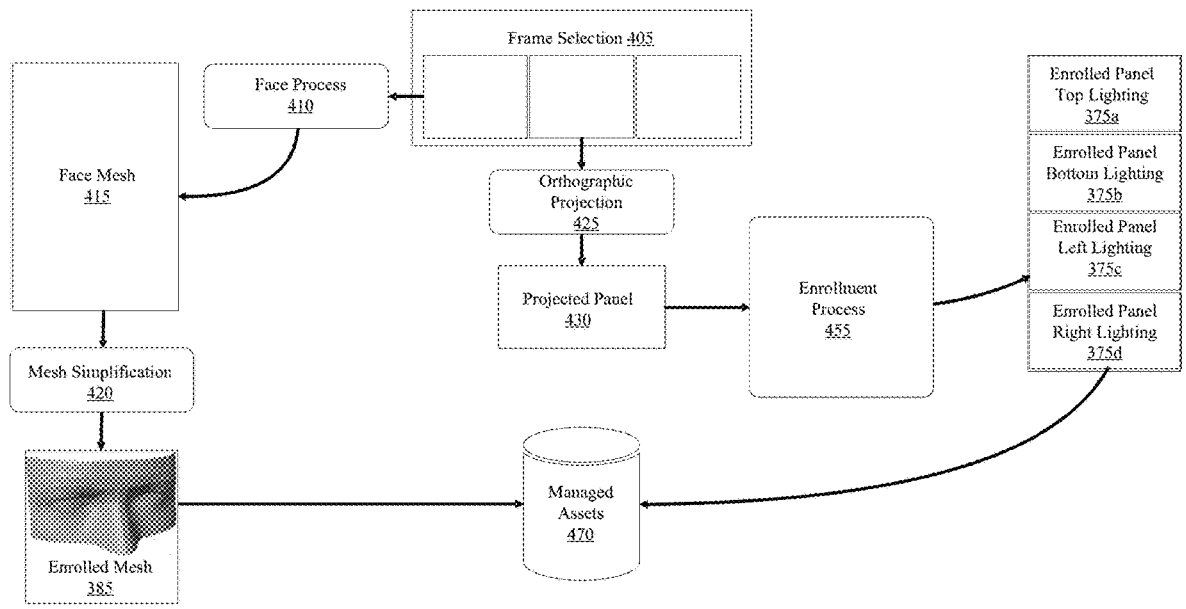
FIG. 4 is a process flow chart illustrating an exemplary enrollment technique in accordance with some implementations.

FIG. 4 is a process flow chart illustrating an exemplary enrollment technique. In this example, sensor data corresponding to a plurality of frames is obtained at frame selection 405 block. For example, during the enrollment process the user may be guided to use a device (e.g., an HMD) to obtain a set of multiple images of themselves. Such images may correspond to different lighting conditions, different viewpoints, and/or different facial expressions, as described above. The user may be guided to capture images of themselves by holding an HMD or other device out in front of them such that sensors that would normally be outward facing when the device is being worn or otherwise used would be oriented towards the user's face. Such outward facing sensors may capture data of a type or quality that sensors on the device cannot while the device is being worn. For example, inward-facing sensors on the device may be limited to IR cameras while the outward facing sensors may capture color image data. Sensor data captured during enrollment may be captured while the user is not wearing the device and thus include or represent parts of the user's face that are blocked (from capture by any sensor) while the device is being worn, e.g., parts of the user's face that are covered or in contact with a light seal of an HMD device while the HMD is being worn.

In the exemplary process of FIG. 4, the frame selection 405 data is used to generate at the orthographic projection 425 block to generate a projected panel 430 (e.g., image data comprising color/texture, depth data for a grid of pixels) representing the face portion of the user from a direction directly in front of a center of the face portion. An algorithm or machine learning model such as a neural network may be used to produce at orthographic projection 425 block to produce the projected panel 430.

The projected panel 430 is input to an enrollment process 455 that uses an algorithm and/or machine learning model, such as a neural network, to generate a plurality of different versions of the projected panel 430 corresponding to different lighting (or other) conditions. The enrollment process 455 may generate enrolled panels corresponding to different lighting conditions, e.g., enrolled panel top lighting 375*a*, enrolled panel bottom lighting 375*b*, enrolled panel left lighting 375*c*, and enrolled panel right lighting 375*d*. The enrollment process 455 may be trained using ground truth data corresponding to actual images of user faces in different lighting conditions. In this example, these enrolled panels 375a-d are orthographic projections generated based on the sensor data obtained at enrollment to which synthetic lighting effects from different directions has been added. These enrolled panels 375a-d are stored as part of the managed assets 470 for use during live experiences to provide rendering of the user's face.

The frame selection 405 data is also used by face process 410 to generate a 3D model such as face mesh 415 representing the face of the user. The mesh simplification 420 process may use the face mesh 415 to generate enrolled mesh 385, which is stored as part of the managed assets 470 for use during live experiences to provide rendering of the user's face. A mesh may be generated using image and/or other sensor data. In one example, image and depth sensor data is captured and used to generate a 3D point cloud that is then converted into a 3D mesh. In some implementations, the face mesh 415 is used by one or more other purposes (aside from external face views of the face portion), for example, being used to generate a 3D avatar or other 3D representation of the user, e.g., of the user's entire head, upper torso, entire body, etc.

Figure 5:
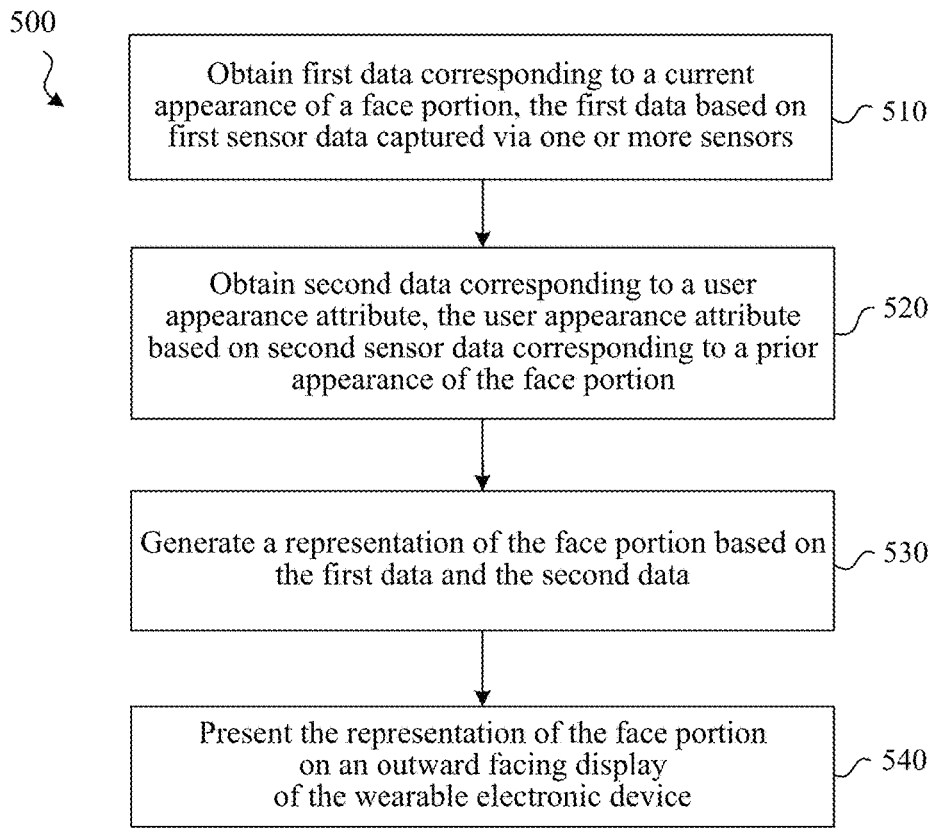
FIG. 5 is a flowchart representation of a method for presenting a view of a device user's face portion in accordance with some implementations.

FIG. 5 is a flowchart representation of a method 500 for presenting a view of a device user's face portion. In some implementations, a device (e.g., device 120 of FIG. 1) performs the techniques of method 500. In some implementations, the techniques of method 500 are performed on a mobile device, desktop, laptop, HMD, or other wearable device. In some implementations, the method 500 is performed by processing logic, including hardware, firmware, software, or a combination thereof. In some implementations, the method 500 is performed on a processor executing code stored in a non-transitory computer-readable medium (e.g., a memory).

At block 502, the method 500 obtains first data corresponding to a current appearance of a face portion, the first data based on first sensor data captured via one or more sensors. In one example implementation, the first data comprises one or more inward facing cameras, e.g., ECAM, facing each eye and surrounding areas of the user's face within an HMD display area while the HMD is being worn by a user. Such cameras may be color, black and white, IR, or any other appropriate camera type.

At block 504, the method 500 obtains second data corresponding to a user appearance attribute, where the user appearance attribute is based on second sensor data corresponding to a prior appearance of the face portion. The second data may correspond to previously-obtained enrollment data. In some implementations, the user appearance attribute corresponds to user skin color/texture, which may not captured as well (or at all) by the first sensors and/or while the device is being worn by the user. The second data may correspond to a set of previously-obtained enrollment data including, as examples, an enrollment mesh or other 3D user model and/or one or more images or orthographic projections depicting the eyes and surrounding areas using images/panels. The second data may be based on images or other sensor data captured while the device is not being worn so that otherwise blocked portions of the face are depicted and in color. The second data may be based on images or other sensor corresponding to different lighting conditions/directions (e.g., enrolled panels with neutral eyes open and looking straight forward).

The second data may include a 3D mesh representing a 3D shape of the face portion. Such a 3D mesh may have been generated based on a user image captured while electronic device was not being worn, as described with respect to FIG. 4.

The second data may include one or more orthographic projections depicting the face portion, the orthographic projections generated based on a user image captured while electronic device was not being worn. The second data may comprise a set of multiple orthographic projections depicting the face portion is different lighting conditions. The different lighting conditions correspond to illumination of the face from different primary light source directions. In some implementations, the orthographic projections depict the face portion with neutral eyes open and looking straight forward.

The user appearance attribute of the second data may correspond to a user skin color or user eye color not depicted in the first sensor data. The user appearance attribute may correspond to a portion of the face portion not depicted in the first sensor data.

At block 506, the method 500 generates a representation of the face portion based on the first data and the second data. For example, this may involve a rendering process (e.g., algorithm, machine learning model such as a neural network) that inputs the first data (e.g., imputing live and selected neutral ECAM data) and outputs an inferred panel representing the current appearance of the face portion with the appearance attribute from the second data. This may involve comparing the live first data with the neutral data (which may be derived from live and/or prior data) to extract motion and using that motion to produce a representation, such as an inferred panel 380 of FIG. 3.

Generating the representation may involve a rendering process 355 producing an inferred panel 380 as described with respect to FIG. 3. Generating the representation of the face portion may involve inputting the first data and the second data to a neural network trained to output the representation of the face portion by combining the current appearance with the user appearance attribute. Generating the representation of the face portion may involve: inputting, to a rendering process, live eye camera data comprising depictions of a portion of the face portion as the first data; inputting, to the rendering process, a neutral 2D image depicting the face portion as the second data; and generating, the representation of the face portion via the rendering process. Neutral eye camera data may be inputted to the rendering process. Generating the representation of the face portion may involve determining a change (e.g., movement) based on the live eye camera data and the neutral eye camera data. Inputting the 2D image depicting the face portion may involve inputting a 2D image depicting the face portion in a lighting condition corresponding to a current lighting condition. Inputting the 2D image depicting the face portion may involve selecting the 2D image depicting the face portion from a set of 2D images depicting the face portion in different lighting conditions, the selecting based on the current lighting condition.

At block 508, the method 500 presents the representation of the face portion on an outward facing display of the wearable electronic device. The representation (such as inferred panel 380) may be mapped to the 3D face representation (e.g., enrolled mesh 385) and displayed on the front of the device, e.g., on an outward facing display of an HMD. The view displayed on the outward facing display may display the eyes to appear to be at their accurate 3D positions by displaying content based on a position of an observer. A lenticular display may be used to present 29 views of the face portion for different observer viewpoints/ directions. The outward facing display may be a flat curved display. The outward facing display may depict the current appearance of eyes and surrounding areas that would otherwise be blocked by the device. If the device is moved (e.g., up and down on the user's face), the eyes and other parts of the face portion will appear to stay in the same positions corresponding to their actual positions. The representation may also be adjusted to limit contrast between the eye sclera and the user's skin to avoid artifacts or undesirable visual effects.

Presenting the representation of the face portion on the outward facing display of the wearable electronic device may involve generating a live 3D face portion representation by mapping the representation to a 3D representation of the face portion and generating a view from a viewpoint of the live 3D face portion representation from a viewpoint. The 3D representation of the face portions may have been generated based on previously-obtained sensor data captured while electronic device was not being worn.

The view may depict content such that a viewer at the viewpoint observes the eyes and surrounding portions of the face portion in 3D positions corresponding to their actual 3D positions.

The method 500 may provide different views of the face portion over time based on a changing position of an observer. The viewpoint may be determined based on determining a relative position of an observer to the wearable electronic device.

Multiple views corresponding to different viewpoints may be provided via a lenticular display.

Figure 6:
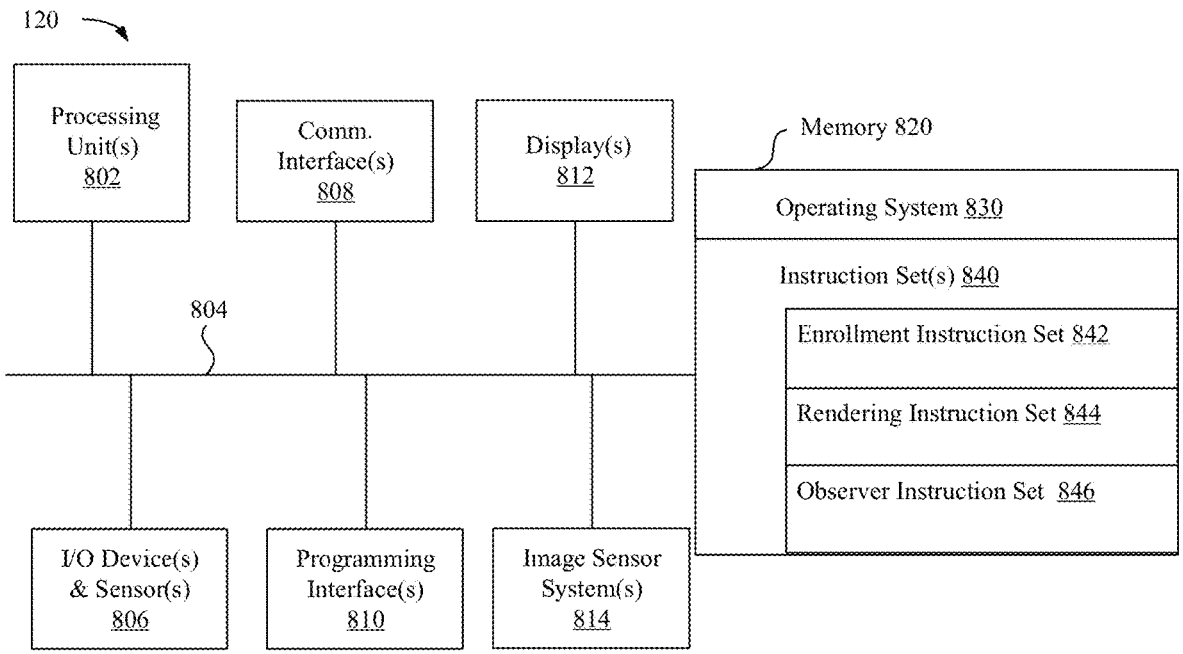
FIG. 6 is a block diagram illustrating device components of an exemplary device according to some implementations.

FIG. 6 is a block diagram of an example device 120. Device 120 illustrates an exemplary device configuration for devices described herein (e.g., device 10, etc.). While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 120 includes one or more processing units 802 (e.g., microprocessors, ASICs, FPGAs, GPUs, CPUs, processing cores, and/or the like), one or more input/output (I/O) devices and sensors 806, one or more communication interfaces 808 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 810, one or more displays 812, one or more interior and/or exterior facing image sensor systems 814, a memory 820, and one or more communication buses 804 for interconnecting these and various other components.

In some implementations, the one or more communication buses 804 include circuitry that interconnects and controls communications between system components. In some implementations, the one or more I/O devices and sensors 806 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 812 are configured to present a view of a physical environment or a graphical environment to the user. In some implementations, the one or more displays 812 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays 812 correspond to diffractive, reflective, polarized, holographic, etc. waveguide displays. In one example, the device 10 includes a single display. In another example, the device 10 includes a display for each eye of the user.

In some implementations, the one or more image sensor systems 814 are configured to obtain image data that corresponds to at least a portion of the physical environment 105. For example, the one or more image sensor systems 814 include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 814 further include illumination sources that emit light, such as a flash. In various implementations, the one or more image sensor systems 814 further include an on-camera image signal processor (ISP) configured to execute a plurality of processing operations on the image data.

The memory 820 includes high-speed random-access memory, such as DRAM, SRAM, DDR RAM, or other random-access solid-state memory devices. In some implementations, the memory 820 includes non-volatile memory, such as one or more magnetic disk storage devices, optical disk storage devices, flash memory devices, or other non-volatile solid-state storage devices. The memory 820 optionally includes one or more storage devices remotely located from the one or more processing units 802. The memory 820 includes a non-transitory computer readable storage medium.

In some implementations, the memory 820 or the non-transitory computer readable storage medium of the memory 820 stores an optional operating system 830 and one or more instruction set(s) 840. The operating system 830 includes procedures for handling various basic system services and for performing hardware dependent tasks. In some implementations, the instruction set(s) 840 include executable software defined by binary information stored in the form of electrical charge. In some implementations, the instruction set(s) 840 are software that is executable by the one or more processing units 802 to carry out one or more of the techniques described herein.

The instruction set(s) 840 include an enrollment instruction set 842, a rendering instruction set 844, and an observer instruction set 846. The instruction set(s) 840 may be embodied a single software executable or multiple software executables.

In some implementations, the enrollment instruction set 842 is executable by the processing unit(s) 802 to generate enrollment data from image data. The enrollment instruction set 842 may be configured to provide instructions to the user in order to acquire image information and determine whether additional image information is needed. To these ends, in various implementations, the instruction includes instructions and/or logic therefor, and heuristics and metadata therefor.

In some implementations, the rendering instruction set 844 is executable by the processing unit(s) 802 to generate and display a representation of a face portion of a face based on the live and/or previously-obtained sensor data. To these ends, in various implementations, the instruction includes instructions and/or logic therefor, and heuristics and metadata therefor.

In some implementations, the observer instruction set 846 is executable by the processing unit(s) 802 to determine whether an observer is present and/or to determine an observation viewpoint/direction of such an observer. To these ends, in various implementations, the instruction includes instructions and/or logic therefor, and heuristics and metadata therefor.

Although the instruction set(s) 840 are shown as residing on a single device, it should be understood that in other implementations, any combination of the elements may be located in separate computing devices. Moreover, FIG. 6 is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of physiological data to improve a user's experience of an electronic device with respect to interacting with electronic content. The present disclosure contemplates that in some instances, this gathered data may include personal information data that uniquely identifies a specific person or can be used to identify interests, traits, or tendencies of a specific person. Such personal information data can include physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve interaction and control capabilities of an electronic device. Accordingly, use of such personal information data enables calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access his or her stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at a wearable electronic device having a processor:
      obtaining first data corresponding to a current appearance of a face portion, the first data based on first sensor data captured via one or more sensors;
      obtaining second data corresponding to a user appearance attribute, wherein the user appearance attribute is based on second sensor data corresponding to a prior appearance of the face portion;
      generating a representation of the face portion based on the first data and the second data; and
      presenting the representation of the face portion on an outward facing display of the wearable electronic device.

2. The method of claim 1, wherein the second data corresponds to previously-obtained enrollment data.

3. The method of claim 1, wherein the second data comprises a 3D mesh representing a 3D shape of the face portion, the 3D mesh generated based on a user image captured while electronic device was not being worn.

4. The method of claim 1, wherein the second data comprises an orthographic projection depicting the face portion, the orthographic projection generated based on a user image captured while electronic device was not being worn.

5. The method of claim 1, wherein the second data comprises a set of multiple orthographic projections depicting the face portion is different lighting conditions.

6. The method of claim 5, wherein the different lighting conditions correspond to illumination of the face from different primary light source directions.

7. The method of claim 5, wherein the orthographic projections depict the face portion with neutral eyes open and looking straight forward.

8. The method of claim 1, wherein user appearance attribute corresponds to a user skin color or user eye color not depicted in the first sensor data.

9. The method of claim 1, wherein user appearance attribute corresponds to a portion of the face portion not depicted in the first sensor data.

10. The method of claim 1, wherein generating the representation of the face portion comprises inputting the first data and the second data to a neural network trained to output the representation of the face portion by combining the current appearance with the user appearance attribute.

11. The method of claim 10, wherein generating the representation of the face portion comprises:
   inputting, to a rendering process, live eye camera data comprising depictions of a portion of the face portion as the first data;

inputting, to the rendering process, a neutral 2D image depicting the face portion as the second data; and generating, the representation of the face portion via the rendering process.

12. The method of claim 11 further comprising inputting neutral eye camera data to the rendering process.

13. The method of claim 12, wherein generating the representation of the face portion comprises determining a change based on the live eye camera data and the neutral eye camera data.

14. The method of claim 11, wherein inputting the 2D image depicting the face portion comprises inputting a 2D image depicting the face portion in a lighting condition corresponding to a current lighting condition.

15. The method of claim 14, wherein inputting the 2D image depicting the face portion comprises selecting the 2D image depicting the face portion from a set of 2D images depicting the face portion in different lighting conditions, the selecting based on the current lighting condition.

16. The method of claim 1, wherein presenting the representation of the face portion on the outward facing display of the wearable electronic device comprises:

generating a live 3D face portion representation by mapping the representation to a 3D representation of the face portion; and generating a view from a viewpoint of the live 3D face portion representation from a viewpoint.

17. The method of claim 16, wherein the 3D representation of the face portions was generated based on previously-obtained sensor data captured while electronic device was not being worn.

18. The method of claim 16, wherein the view depicts the view such that a viewer at the viewpoint observes the eyes and surrounding portions of the face portion in 3D positions corresponding to their actual 3D positions.

19. The method of claim 16 further comprising providing different views of the face portion via a lenticular display.

20. The method of claim 16, wherein the viewpoint is determined based on determining a relative position of an observer to the wearable electronic device.

21. The method of claim 1, wherein the wearable electronic device comprises a head mounted device (HMD) that blocks a direct view the face portion when the electronic device is being worn.

22. A wearable device comprising:
a non-transitory computer-readable storage medium;
one or more sensors; and
one or more processors coupled to the non-transitory computer-readable storage medium, wherein the non-transitory computer-readable storage medium comprises program instructions that, when executed on the one or more processors, cause the one or more processors to perform operations comprising:

obtaining first data corresponding to a current appearance of a face portion, the first data based on first sensor data captured via the one or more sensors;

obtaining second data corresponding to a user appearance attribute, wherein the user appearance attribute is based on second sensor data corresponding to a prior appearance of the face portion;

generating a representation of the face portion based on the first data and the second data; and presenting the representation of the face portion on an outward facing display of the wearable electronic device.

23. The wearable device of claim 22, wherein the second data corresponds to previously-obtained enrollment data.

24. The wearable device of claim 22, wherein the second data comprises a 3D mesh representing a 3D shape of the face portion, the 3D mesh generated based on a user image captured while electronic device was not being worn.

25. A non-transitory computer-readable storage medium, storing program instructions executable on a device including one or more processors to perform operations comprising:

obtaining first data corresponding to a current appearance of a face portion, the first data based on first sensor data captured via the one or more sensors;

obtaining second data corresponding to a user appearance attribute, wherein the user appearance attribute is based on second sensor data corresponding to a prior appearance of the face portion;

generating a representation of the face portion based on the first data and the second data; and presenting the representation of the face portion on an outward facing display of the wearable electronic device.

* * * * *